(No Model.) 2 Sheets—Sheet 1.

W. P. WHITE.
ANIMAL TRAP.

No. 362,343. Patented May 3, 1887.

Witnesses
J. K. Smith
James H. Beattie,

Inventor.
William P. White
By J. L. Browne
Ass'o. Attorney (No Model.) 2 Sheets—Sheet 2.

W. P. WHITE.
ANIMAL TRAP.

No. 362,343. Patented May 3, 1887.

Witnesses:
J. K. Smith
James W. Beattie

Inventor.
William P. White
By F. L. Brown
his Atty

United States Patent Office.

WILLIAM PRICE WHITE, OF LOUISVILLE, KENTUCKY.

ANIMAL-TRAP.

SPECIFICATION forming part of Letters Patent No. 362,343, dated May 3, 1887.

Application filed March 8, 1887. Serial No. 230,134. (No model.)

*To all whom it may concern:*

Be it known that I, WILLIAM PRICE WHITE, a citizen of the United States, residing at Louisville, in the county of Jefferson and State of Kentucky, have invented certain new and useful Improvements in Entrance-Ways to Traps; and I do hereby declare the following to be a full, clear, and exact description of the invention, such as will enable others skilled in the art to which it appertains to make and use the same.

Figure 1:
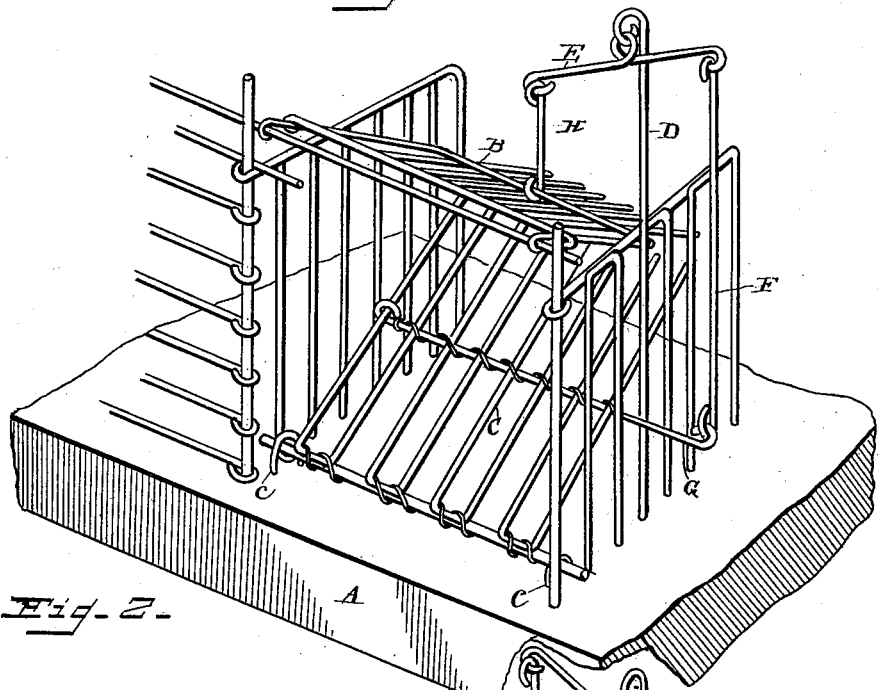
Figure 2:
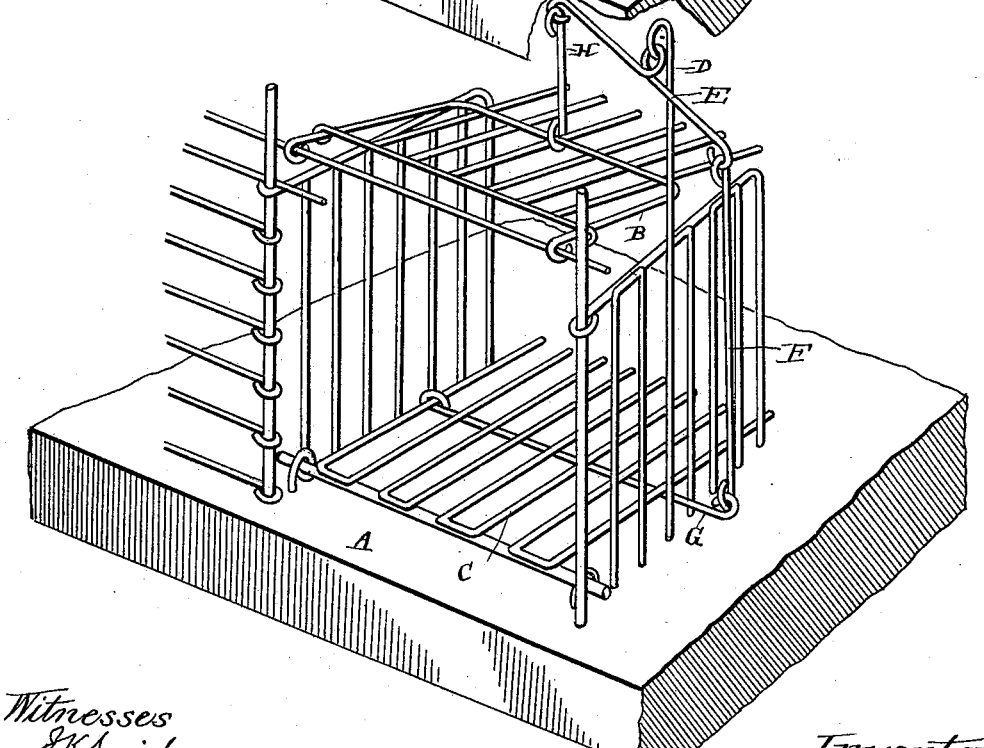
Figure 3:
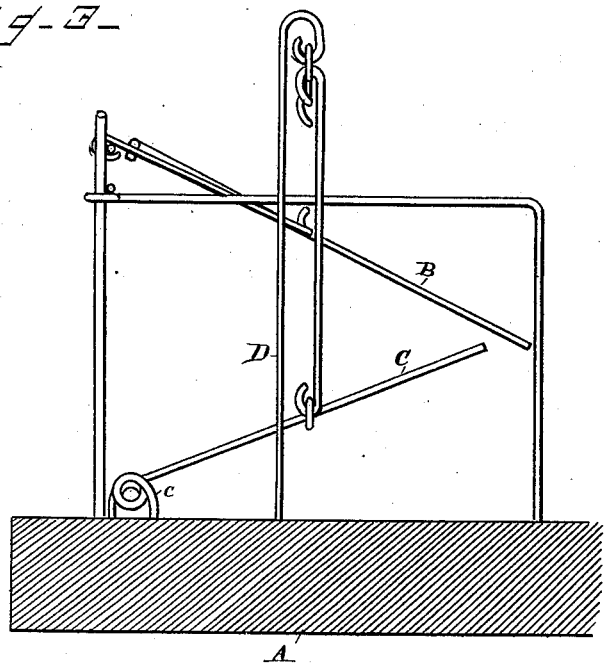
Figure 4:
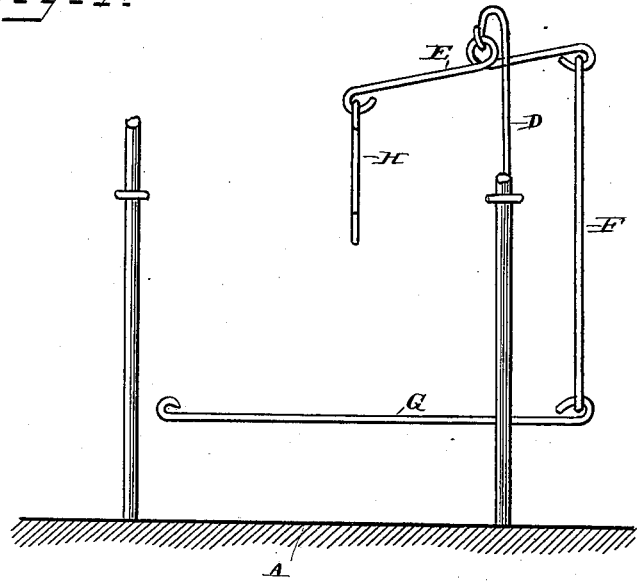

Figure 1, Sheet No. 1, represents a perspective view of my improved entrance-way with the doors closed. Fig. 2, Sheet No. 1, is a like view of the same with the doors open. Fig. 3, Sheet 2, is a side view of the doors and the opening and closing apparatus. Fig. 4, Sheet No. 2, is a front view of the opening and closing apparatus.

In the drawings like letters indicate like parts.

A is the floor of a trap to which the entrance-way is attached.

B is an upper vertically-swinging door in the entrance-way.

C is a lower vertically-swinging door in the same, which hinges in the eyes $c\ c$.

D is one of the upright bars composing the sides of the entrance-way. It is prolonged and has its upper end bent to form the fulcrum of the lever E.

F is a rod having its upper end attached to the shorter arm of the lever E and its lower end to the cross-piece $g$ of the lower door, C.

H is a rod with its upper end attached to the longer arm of the lever E and its lower end to the upper door, B.

In practice my improved entrance-way is habitually closed, and the upper and lower doors, B and C, are of about the same weight; but the upper door, B, being attached to the longer arm of the lever E, tends to fall by its own gravity and to draw the lower door, C, upward by means of the lever E and the rods H and F, until the ends of the doors meet, as in Fig. 1, Sheet No. 1, and Fig. 3, Sheet No. 2, and close the entrance-way.

When an animal, attracted by the bait within or other animals already entrapped, seeks to pass into the entrance, as soon as he places his foot on the lower door, C, it falls by his weight, drawing the rod F and the shorter arm of the lever E, attached to it, downward, and raising the longer arm of the lever E, the rod H, and the upper door, B, thus leaving a free open space before the animal, inviting it to enter. As soon as the animal passes into the trap the door B falls by its gravity and draws the rod H and the longer arm of the lever E, attached to it, downward, and raises the shorter arm of the lever E, the rod F, and the lower door, C, thus closing the entrance-way.

My improved entrance-way can be cheaply made, and is applicable to almost any form of trap. It can be used for catching wolves, foxes, minks, weasels, rats, mice, fish, birds, and the like. It obviates the use of springs and weights.

Having fully described my improved entrance-way, what I claim as new and of my invention, and desire to secure by Letters Patent, is—

1. In an animal-trap, the combination of the vertically-swinging entrance-gates having link and pivotal connections with each other, whereby the downward pressure of the lower gate by the weight thereon of the animal entering the trap will cause the upper gate to rise, and allow such upper gate to fall by its own gravity upon the removal of said pressure, substantially as set forth.

2. In an entrance-way to traps, the combination, with the swinging gates B C and the side bar, D, of the trap-frame extended upward and terminating at its end in a loop or eye, of the lever E, fulcrumed in such loop at one side of the center of its length and having its long arm connected to the upper gate, B, by rod H and its short arm to the lower gate, C, by rod F, substantially as set forth.

In testimony whereof I affix my signature in presence of two witnesses.

WILLIAM PRICE WHITE.

Witnesses:
J. K. SMITH,
JAMES W. BEATTIE.